(12) United States Patent
Margalit

(10) Patent No.: US 9,721,013 B2
(45) Date of Patent: *Aug. 1, 2017

(54) METHOD AND SYSTEM FOR PROVIDING TARGETED SEARCHING AND BROWSING

(71) Applicant: Mordehai Margalit Holding Ltd., Zichron Yaakov (IL)

(72) Inventor: Mordehai Margalit, Zichron Yaakov (IL)

(73) Assignee: Mordehai Margalit Holding Ltd., Zichron Yaakov (IL)

( * ) Notice: Subject to any disclaimer, the term of this patent is extended or adjusted under 35 U.S.C. 154(b) by 62 days.

This patent is subject to a terminal disclaimer.

(21) Appl. No.: 13/773,757

(22) Filed: Feb. 22, 2013

(65) Prior Publication Data

US 2014/0244608 A1    Aug. 28, 2014

Related U.S. Application Data

(63) Continuation-in-part of application No. 13/682,058, filed on Nov. 20, 2012, now Pat. No. 8,903,818, and a continuation-in-part of application No. 12/558,776, filed on Sep. 14, 2009, now Pat. No. 8,341,151.

(60) Provisional application No. 61/096,985, filed on Sep. 15, 2008.

(51) Int. Cl.
G06F 17/30 (2006.01)

(52) U.S. Cl.
CPC ............... *G06F 17/30864* (2013.01)

(58) Field of Classification Search
CPC ........ G06F 17/30864; G06F 17/30867; G06Q 30/02
USPC ........................................................ 707/706
See application file for complete search history.

(56) References Cited

U.S. PATENT DOCUMENTS

| | | | |
|---|---|---|---|
| 5,717,925 A | 2/1998 | Harper et al. | |
| 6,327,574 B1 | 12/2001 | Kramer et al. | |
| 6,411,724 B1 | 6/2002 | Vaithilingam et al. | |
| 6,768,984 B2 | 7/2004 | Allen et al. | |
| 7,034,833 B2* | 4/2006 | Epshteyn | 345/473 |
| 7,254,594 B2 | 8/2007 | Allen et al. | |
| 7,340,458 B2 | 3/2008 | Vaithilingam et al. | |
| 7,600,017 B2 | 10/2009 | Holtzman et al. | |
| 7,756,914 B2 | 7/2010 | Allen et al. | |
| 7,844,605 B2 | 11/2010 | Koran | |
| 8,001,140 B2 | 8/2011 | Dexter | |
| 8,341,151 B2* | 12/2012 | Margalit et al. | 707/733 |

(Continued)

*Primary Examiner* — Scott A Waldron
*Assistant Examiner* — Dongming Wang
(74) *Attorney, Agent, or Firm* — Intrinsic Law Corp.

(57) ABSTRACT

A server constituted a processor and a server memory, the processor arranged to: provide a selectable plurality of attributes, the plurality of attributes stored on the server memory; provide, for each selected one of the plurality of attributes, a selectable plurality of values, the plurality of values stored on the server memory; and generate an archetype responsive to the selected values of the selected attributes. Preferably, a system exhibiting the server and a user computing station in communication with the server, is provided, the user computing station comprising a user input device, wherein each of the selected one of the plurality of attributes is selected responsive to the user input device, and wherein each of the selected one of the plurality of values for each of the selected one of the plurality of attributes is selected responsive to the user input device.

22 Claims, 6 Drawing Sheets

(56) References Cited

U.S. PATENT DOCUMENTS

| | | |
|---|---|---|
| 2001/0013009 A1* | 8/2001 | Greening et al. ............... 705/10 |
| 2001/0056437 A1 | 12/2001 | Allen et al. |
| 2002/0062368 A1 | 5/2002 | Holtzman et al. |
| 2002/0156767 A1 | 10/2002 | Costa et al. |
| 2003/0033161 A1* | 2/2003 | Walker et al. .................... 705/1 |
| 2004/0220953 A1 | 11/2004 | Allen et al. |
| 2005/0080764 A1 | 4/2005 | Ito |
| 2006/0230028 A1* | 10/2006 | Kellet et al. ...................... 707/3 |
| 2006/0271390 A1 | 11/2006 | Rich et al. |
| 2007/0011122 A1 | 1/2007 | Hall et al. |
| 2007/0073799 A1* | 3/2007 | Adjali .................. H04W 28/06 709/200 |
| 2007/0156614 A1 | 7/2007 | Flinn et al. |
| 2007/0174220 A1 | 7/2007 | Flinn et al. |
| 2007/0198937 A1 | 8/2007 | Paris |
| 2007/0276797 A1 | 11/2007 | Allen et al. |
| 2008/0155555 A1 | 6/2008 | Kwong |
| 2008/0263025 A1 | 10/2008 | Koran et al. |
| 2008/0288354 A1 | 11/2008 | Flinn et al. |
| 2008/0319942 A1* | 12/2008 | Courdy et al. .................... 707/3 |
| 2009/0018918 A1 | 1/2009 | Moneypenny et al. |
| 2009/0043719 A1 | 2/2009 | Hall et al. |
| 2009/0150806 A1* | 6/2009 | Evje et al. .................... 715/762 |
| 2009/0192998 A1 | 7/2009 | Paulsen |
| 2009/0216737 A1 | 8/2009 | Dexter |
| 2010/0169338 A1 | 7/2010 | Kenedy et al. |
| 2010/0274782 A1 | 10/2010 | Barbierei et al. |
| 2011/0191325 A1 | 8/2011 | Dexter et al. |
| 2011/0289392 A1 | 11/2011 | Naqvi |
| 2014/0081968 A1* | 3/2014 | Morris .......................... 707/736 |

* cited by examiner

METHOD AND SYSTEM FOR PROVIDING TARGETED SEARCHING AND BROWSING

RELATED APPLICATIONS

This application is related to and claims the benefit and priority of related U.S. Provisional Application No. 61/096,985 filed on Sep. 15, 2008, U.S. patent application Ser. No. 12/558,776 filed on Sep. 14, 2009, now U.S. Pat. No. 8,341,151, and is a continuation in part of U.S. patent application Ser. No. 13/682,058, filed on Nov. 20, 2012, all of which are hereby incorporated by reference.

TECHNICAL FIELD

This application relates to computer systems including systems and methods for searching information in electronic repositories, and more particularly, to systems and methods that deliver targeted searches over a network.

BACKGROUND

One of the most common activities related to the Internet is searching for information. The search for information is conducted either via dedicated portal web sites, or via search options provided as part of information bearing sites. Typically, the search is conducted by providing one or more key words, and some defined relation between them. One of the common problems of searching is the wealth of information provided. In many cases the user needs to review many items before identifying his desired target information. To resolve this issue the user needs to add additional keywords in order to hone in on his requirements and filter out unwanted information. In parallel, much effort has been devoted to relieve the user of adding keywords by providing various forms of search enhancement.

The search enhancement approaches can be broadly separated into two types: In one instance, semantic search, with the goal of enabling the user to describe his information needs rather than delving on the mechanics of keywords. In another instance, collaborative filtering approaches, where the user's activities, interest or reference group are used to hone in on the user's interests and thus identify the appropriate target information.

Since the results of a search are displayed as a list, a key issue in providing the information to the user is to bring relevant information to the top, or near the top, of the list. The relative location in the list in prior art systems is defined by the rank of the web site in the search engine's ranking system.

Across the chasm of the search engines lies the web pages themselves, organized into a web site. The goal in producing a web site is to reach out to the information seekers and provide the content of the web pages of the web site to the information seeker. Since the connection to the information seeker is facilitated by the search engines, the web sites employ methods broadly termed Search Engine Optimization (SEO) which attempt to enhance the ranking of the web site, and/or web pages thereof, by manipulation and incorporation of keywords into the web site.

Both of the search enhancement approaches, as well as the web site's SEO to enhance their ranking, are based on segmentation of target audience and optimizing keywords based on the segmentation. Unfortunately, the web sites lack a general and direct method of increasing their rank in the search engine for a segmented audience. Increasing the rank for a target audience allows for a more efficient use of resources, and preferably further results in an improved user experience. It is to be noted that privacy concerns must be taken into account, to ensure that identifying information is not made publicly available.

There is thus a need for a method for enabling sites to define their target audience in a way that improves the ranking of search results for that target audience.

An additional need is to enable web sites, social networks, advertisers and mobile applications to tune their content based on user selectable attributes.

A further need is to enable physical objects such as a car, a house, or physical locations such as a shop, train station to adapt their characteristics based on user selectable attributes.

SUMMARY

Accordingly, it is a principal object of the present invention to overcome at least some of the disadvantages of the prior art. In certain embodiments this is provided by a system comprising a server and a user computing station. Stored on the server is a plurality of attributes, such as: age, gender, profession, residence area, income level and marital status, without limitation. In some cases a plurality of values is also stored, with each stored attribute having associated therewith a plurality of values. A user can select, via the user computing station, one or more of the plurality of stored attributes and appropriate values for each selected attribute. The server is arranged to then provide an archetype corresponding to the selected attributes and values, which is in one embodiment stored on the user computing station. In one embodiment the provided archetype does not support unique user identifying information. Preferably, the user is provided with an API, toolbar, or other means of defining, changing, adjusting and tuning of the archetype. In another embodiment the provided archetype is stored on the server.

In one embodiment the system further comprises a network accessible host arranged to retrieve from the server one or more of the plurality of stored attributes, and one or more values for each retrieved attribute. In one embodiment, the network accessible host is arranged to then generate a meta-descriptor for an object stored on the network accessible host, corresponding to the selected attributes and values. In one embodiment the generated meta-descriptor is generated responsive to the content of the object. In one embodiment a plurality of meta-descriptors is stored on the server and the network accessible host is arranged to retrieve from the server a meta-descriptor for an object stored on the network accessible host. In one embodiment the meta-descriptor is attached as a tag to the object. In one embodiment the meta-descriptor can be attached to an existing meta-data tag attached to the object. In one embodiment the attached meta-descriptor is broadcast throughout the network, for example by broadcasting the meta-descriptor through search engines.

In one embodiment, for each generated archetype a single corresponding meta-descriptor is generated. In another embodiment, for each generated archetype a plurality of meta-descriptors are created, each meta-descriptor at least partially corresponding to the generated archetype.

In one embodiment each attribute and value stored on the server has a corresponding code. A user, having defined an archetype, is provided with a code, the provided code being an encoded function of the archetype. For each meta-descriptor a code is similarly provided, the provided meta-descriptor code being an encoded function of the meta-descriptor. When the user performs a search for an object, the codes representing the archetype associated with the user are compared with the codes representing the meta-descriptors attached to the objects stored on the network accessible host. Objects that do not have a meta-descriptor corresponding with the user's archetype are not displayed. In one embodiment the user can choose to search using the above described archetype filtering or to search without the archetype filtering. In one embodiment, wherein the searched for object is a web site, the archetype filtering is done by a search engine. In another embodiment, wherein the searched for object is a web site, the archetype filtering is done by the user's web browser. In yet another embodiment, wherein the searched for object is a file stored in a database, the archetype filtering is done by a program stored on a user computing station.

In some embodiments, the present disclosure is directed to a method for enabling sites to define their target audience in a way that improves the ranking of search results for that target audience. In an aspect, the present method and system directly define the target audience of a search and do not infer it from heuristics, statistics and/or collaborative filtering.

Additional features and advantages of the invention will become apparent from the following drawings and description.

BRIEF DESCRIPTION OF THE DRAWINGS

For a better understanding of various embodiments of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION

Figure 1:
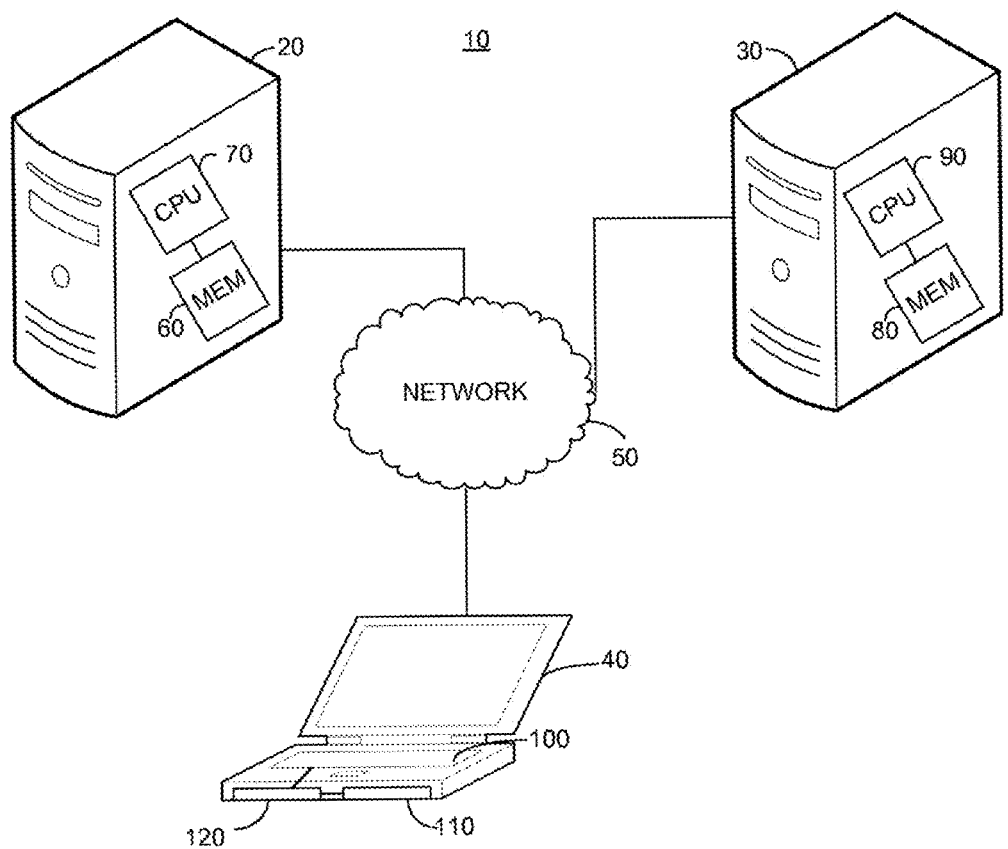
FIG. 1 illustrates a high level schematic diagram of a system for targeted searching over a network, comprising a user computing station, a server, and a network accessible host, according to an exemplary embodiment.

Having described the background of the invention and some present limitations it overcomes, and having summarized some aspects of the invention, it is to be understood that the invention is not limited in its application to the details of construction and the arrangement of the components set forth in the following description or illustrated in the drawings. The invention is applicable to other embodiments being practiced or carried out in various ways. Also, it is to be understood that the phraseology and terminology employed herein is for the purpose of description and should not be regarded as limiting.

FIG. 1 illustrates a high level block diagram of a system 10 for targeted searching over a network, comprising: a server 20, comprising a memory 60 and a processor 70; a network accessible host 30, comprising a memory 80 and a processor 90; a user computing station 40, comprising a user input device 100, a memory 110 and a processor 120; and a network 50. Each of server 20, particularly processor 70 of server 20, network accessible host 30, particularly processor 90 of server 20, and user computing station 90, particularly processor 120 of user computing station 90, are connected to network 50, which functions to allow interconnection there between. Memory 60 is in communication with processor 70 and memory 80 is in communication with processor 90. Processor 120 is in communication with each of user input device 100 and memory 110. User input device 100 comprises a keyboard, mouse, touch screen, or any suitable device designed to enable a user to make a selection.

Server 20, network accessible host 30 and network 50 are illustrated as being external to user computing station 40 however this is not meant to be limiting in any way. In one embodiment server 20 is a computer program located on processor 120, as will be described further hereinto below. In another embodiment network accessible host 30 is a database located on memory 110, as will be described further hereinto below. In yet another embodiment network 50 is an operating system running on processor 120, as will be described further hereinto below. Network 50 can be any type of network, including without limitation the Internet, an Intranet or other local area network.

Figure 2:
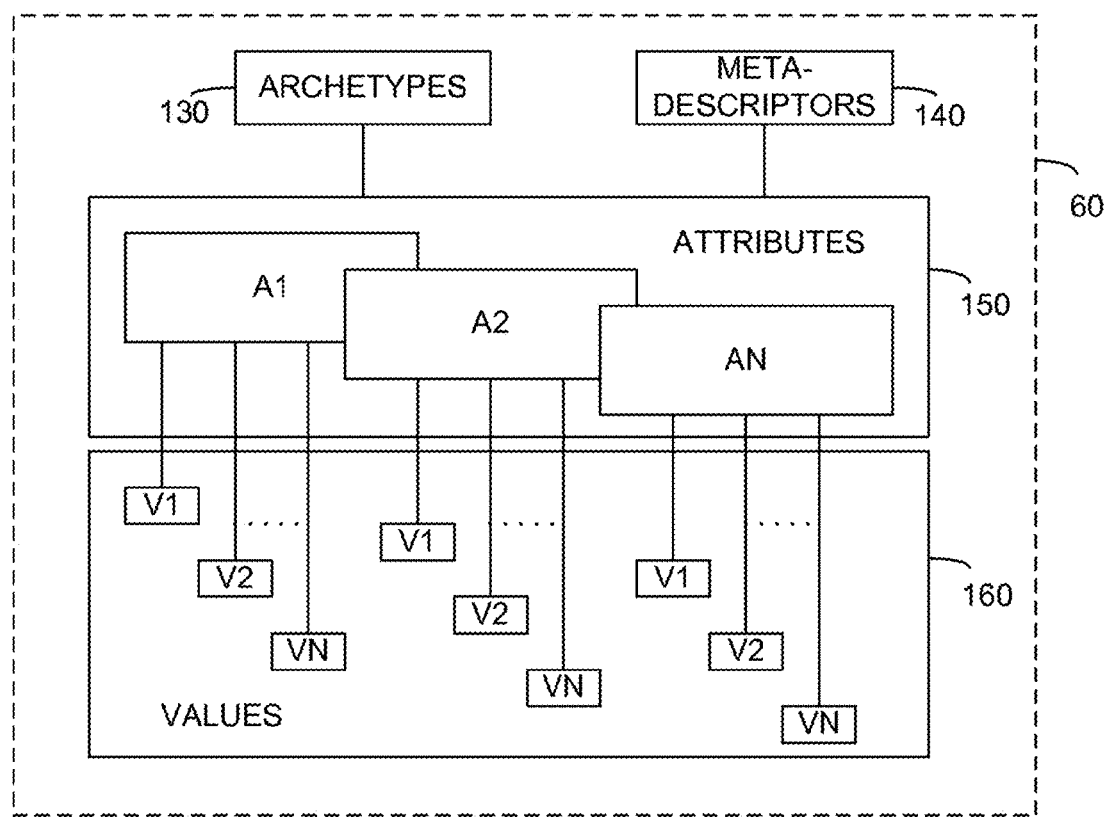
FIG. 2 illustrates a high level functional diagram of the memory portion of the server of FIG. 1 according to an exemplary embodiment.

FIG. 2 illustrates a high level functional diagram of memory 60 of server 20 of FIG. 1, comprising: an archetype database 130; a meta-descriptor database 140; an attribute database 150 comprising a plurality of attributes, denoted respectively A1, A2, . . . AN; and a value listing 160 comprising a plurality of attributes V1, V2, . . . VN for each attribute of attribute database 150. For each attribute in attribute database 150, at least one value is provided in value listing 160.

The term values used herein include any word, or words, defining the different options that exist for each attribute. In one non-limiting example, in which an attribute for age is defined, specific ranges of ages are grouped together. Alternatively, each particular age value is enabled. In another non-limiting example, a list of professions is provided, each pre-defined profession being term a value associated with the attribute profession. In yet another non-limiting example, areas of residence are provided, each pre-defined area of residence being termed a value associated with the attribute residence. Preferably, the pre-defined areas of residence are provided to be sufficiently broad so as not to provide significant identifying information.

Figure 3:
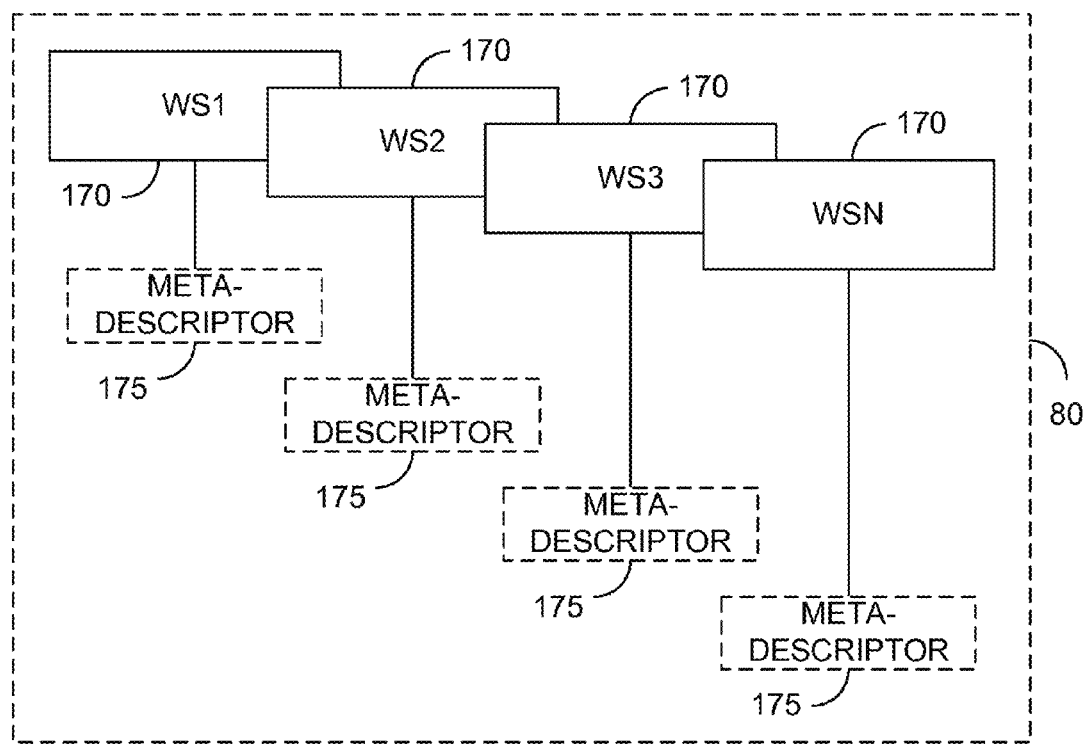
FIG. 3 illustrates a high level functional diagram of the memory portion of the network accessible host of FIG. 1 according to an exemplary embodiment.

FIG. 3 illustrates a high level functional diagram of memory 80 of network accessible host 30 of FIG. 1, comprising a plurality of objects 170, denoted respectively WS1, WS2, WS3, . . . WSN. Optionally, as will be described further hereinto below, for each object 170 a particular meta-descriptor 175 is attached preferably as part of a tag associated with a respective object 170. Each object 170 may be constituted of a web site, a plurality of web sites, one or more web pages, an object, or a plurality of files and/or folders, without limitation.

Figure 4:
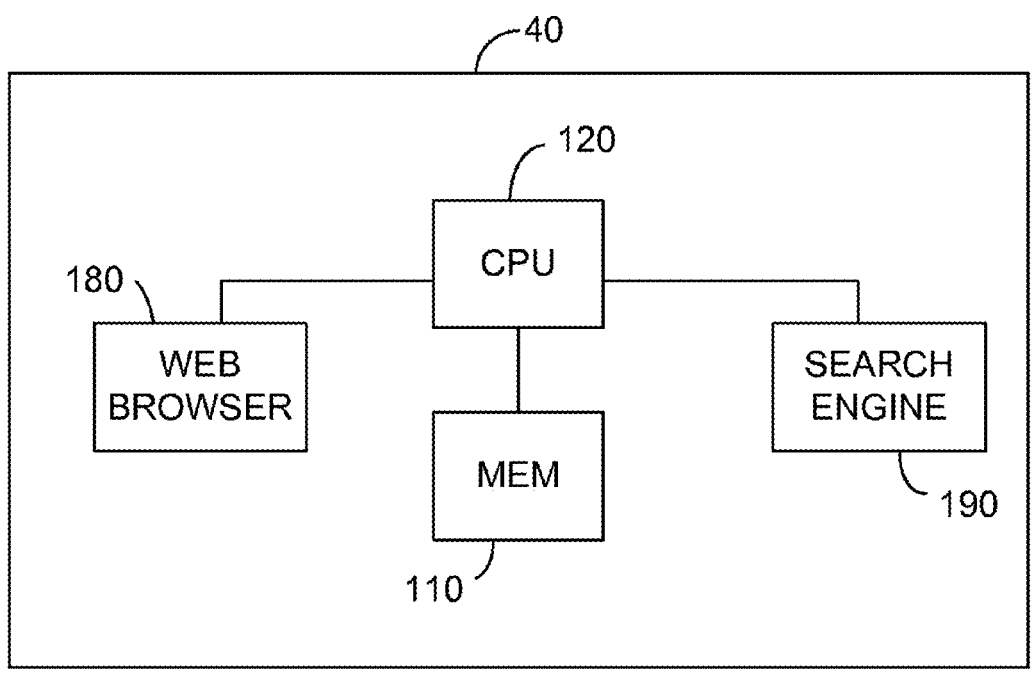
FIG. 4 illustrates a high level schematic diagram of the user computing station of FIG. 1 according to an exemplary embodiment.

FIG. 4 illustrates a high level functional diagram of user computing station 40 of FIG. 1, further comprising a web browser 180 and a search engine 190. Web browser 180 and search engine 190 are each in communication with processor 120, and as indicated above in relation to system 10 of FIG. 1, processor 120 is in communication with memory 110.

Search engine 190 is shown as a separate function from web browser 180, however this is not meant to be limiting in any way. Web browser 180 and search engine 190 are illustrated as being stored on computing station 40, however this is not meant to be limiting in any way. In another embodiment web browser 180 and/or search engine 190 are stored external of user computing station 40 and can be accessed through network 50.

For ease of understanding the operation of FIGS. 1-4 will now be described together. In one embodiment, a user searching for information accesses web browser 180 via user input device 100. Web browser 180 provides the user with the option of choosing an existing archetype, preferably stored on one of archetypes database 130 and memory 110, or defining a new archetype. Definition of an archetype, as described further below, is advantageous as it provides a user with a means of characterization without revealing actual personal identifying information.

In the event that the user chooses to define a new archetype, web browser 180 communicates with server 20 and provides the user, via web browser 180, a list of attributes stored in attribute database 150. The list of attributes stored in attribute database 150 comprises, in one non-limiting illustrative example, any of: age, gender, profession, residence area, income level and marital status. Preferably, the list of attributes stored in attribute database 150 does not include unique identifying information, such as, without limitation: name, address and telephone number. The user may select one or more attributes. For each attribute chosen by the user, processor 70 provides the user with a list of pre-determined values associated with the chosen attribute, stored in value listing 160, and the user selects one or more values to be assigned for the archetype. The selected attribute and the respective associated selected value are then added to the user's archetype.

In one embodiment an API, toolbar, extension to a web browser, an integrated web browser, a stand alone program, designated cookies, a web site, or other means are provided on user computing station 40, or accessible via user computing station 40, allowing the user to define, change, adjust and/or tune the generated archetype by accessing server 20. In one non-limiting embodiment, once the archetype is defined only the values associated with the archetype can be viewed by the user, while in another embodiment the attribute descriptors associated with the values can be viewed by the user.

In another embodiment, the archetype information is accessible for web sites, social networks, advertisers or mobile applications. The archetype information is located on either (or both) of the user device or server. The archetype information can be accessible from the user computer or mobile device. Alternatively, the information can be accessed from the server. The web site, social network, advertisers or mobile applications use the information to tune their content based on user selectable attributes. In this manner, the website can have different colors, graphics, layout, form and function based on such attributes as age, occupation, interests, etc.

In an illustrative example, the viewable archetypes is in the form of: age: 40-50; engineer, male, likes gadgets; profession: student, gender: female, age: 13-16, likes music, likes rock music. Obviously, many such examples are comprehended by this discussion and the examples given are not to be considered limiting of the invention in any way.

The defined archetype is then stored, in one embodiment, in memory 110 of user computing station 40. In another embodiment, the defined archetype is stored, preferably associated with a user name and password on archetype database 130. In one embodiment the defined archetype is further stored on archetype database 130, as one of the combinations of archetypes which have been defined, for use in developing statistical information regarding defined archetypes and attributes.

In the event that the user selects to utilize an existing archetype, in an embodiment in which defined archetypes are stored in memory 110, the list of stored archetypes are displayed to the user for selection, and in an embodiment in which defined archetypes are stored on archetype database 130 web browser 180 communicates with server 20 and provides to the user a list of archetypes stored in archetype database 130, accessed via user name and password. In either event, the user selects one of the defined archetypes. In one embodiment the selected archetype is then stored in memory 110 of user computing station 40 to be associated with the current browsing session, or used as the default for all future browsing sessions.

In one embodiment each archetype is encoded such that each field in the archetype is allocated a different attribute. Utilizing the non-limiting illustrative example indicated above, the archetype is in the form of: 'age', 'gender', 'profession', 'hobby', wherein each field is filled in with the user selected values. In one embodiment each user-selected value has a predetermined code, with a non-selected attribute being coded with a predefined "don't care" value. In one non-limiting illustrative example, encoding of an archetype is shown in the table below, in which the first column describes the attribute type, the second column describes the position in the archetype string, the third column describes the particular attribute value, and the fourth column describes the code symbol:

Table I

| Attribute | Field position (from left) | Value | Code |
| --- | --- | --- | --- |
| Age | 1 | 13-16 | a |
|  |  | 16-18 | b |
|  |  | 18-21 | c |
|  |  | 21-31 | d |
|  |  | 31-41 | e |
| Gender | 2 | male | m |
|  |  | female | f |
| Profession | 3 | teacher | a |
|  |  | student | b |
|  |  | engineer | c |
|  |  | accountant | d |
| Hobbies | 4 | Rock music | a1 |
|  |  | Classical music | a2 |
|  |  | movies | bx |
|  |  | books | cx |
|  |  | Adventure books | c5 |

Table I is but an example. Here the archetype 'age: 31-41, male, engineer, likes movies' will be encoded as 'emcbx'. The archetype 'age: 31-41, male, likes movies' will be encoded as 'emxbx', wherein the first 'x' represents "don't care".

In another embodiment each attribute is allocated a respective pre-determined code, and each value associated with each attribute is allocated a respective pre-determined code. In yet another embodiment the archetype is left unencoded.

In one embodiment processor 70 of server 20 is further arranged to generate meta-descriptors responsive to the archetypes stored in archetype database 130. The generated meta-descriptors comprise attributes and values stored in attribute database 150 and the associated values stored in value listing 160, respectively, as described above in relation to generating archetypes. In one embodiment one meta-descriptor is generated for each archetype stored in archetype database 130, with the generated meta-descriptor fully corresponding to the respective archetype, i.e. including the same attributes and values as the respective archetype. In an embodiment wherein the archetype is encoded, the meta-descriptor is in one embodiment encoded in the same way. In another embodiment a plurality of meta-descriptors are generated for each archetype stored in archetype database 130, with each generated meta-descriptor corresponding to a portion of the respective archetype, i.e. a portion of the attributes and values of each meta-descriptor is the same as a portion of the attributes and values of the archetype. In the embodiment wherein the archetype is encoded, with each field of the archetype representing a different attribute, the meta-descriptor corresponding to a portion of an archetype is in one embodiment encoded in the same way, with the fields not corresponding to the specific portion of the archetype being encoded as "don't care".

In another embodiment one meta-descriptor is generated corresponding to a plurality of archetypes, wherein each attribute of the meta-descriptor may include a plurality of values. In one non-limiting illustrative example a meta-descriptor could be 'age: 13-16, 16-18, 18-21; gender: male, female'. In all of the above embodiments each meta-descriptor is preferably then stored in meta-descriptor database 140 associated with an address of the associated object 170, as described above.

Alternatively, each meta-descriptor is stored in meta-descriptor 175 attached preferably as part of a tag associated with the respective object 170. More specifically, the meta-descriptor is chosen so as to represent the targeted population of the object 170. In one embodiment, objects 170 represent a plurality of web sites, wherein a meta-descriptor is attached to each web site such that the meta-descriptor represents the targeted population of the web site. In another embodiment a meta-descriptor is attached to each web page of each web site such that the meta-descriptors represent the different targeted populations of the different pages of the web sites. In one embodiment the meta-descriptor is attached to an existing meta-data tag.

In one embodiment processor 90 is arranged to retrieve attributes from attribute database 150 and to retrieve for each retrieved attribute values from value database 160. The retrieved attributes and values represent the target population of an object 170. As described above, for each attribute there may be a plurality of values selected, as the target population may include a wide range of people. Processor 90 is further arranged to generate a meta-descriptor for the object 170 and to attach the generated meta-descriptor thereto, as described above.

In one non-limiting illustrative example a user located at user computing station 40 accesses search engine 190 in order to search for a desired object 170 accessible via network 50. In one embodiment search engine 190 compares the archetype associated with the user with the meta-descriptors attached to the plurality of objects 170 and presents the user only with objects 170 exhibiting a meta-descriptor corresponding with the user's archetype. In one embodiment the user can decide if search engine 190 should perform such filtering, or not. In another embodiment the comparing and filtering, as described above, is done by web browser 180. In one embodiment the meta-descriptor attached to an object 170 is broadcast throughout network 50, for example by broadcasting the meta-descriptor through search engines, such as search engine 190.

In the embodiment wherein network accessible host 30 is a database stored on memory 110, in one embodiment the creating of archetypes and meta-descriptors as described above is done by a computer program run on processor 120. In such an embodiment archetypes and meta-descriptors are created to facilitate quick finding of files located in a database stored on memory 110 relevant to a specific user.

Figure 5:
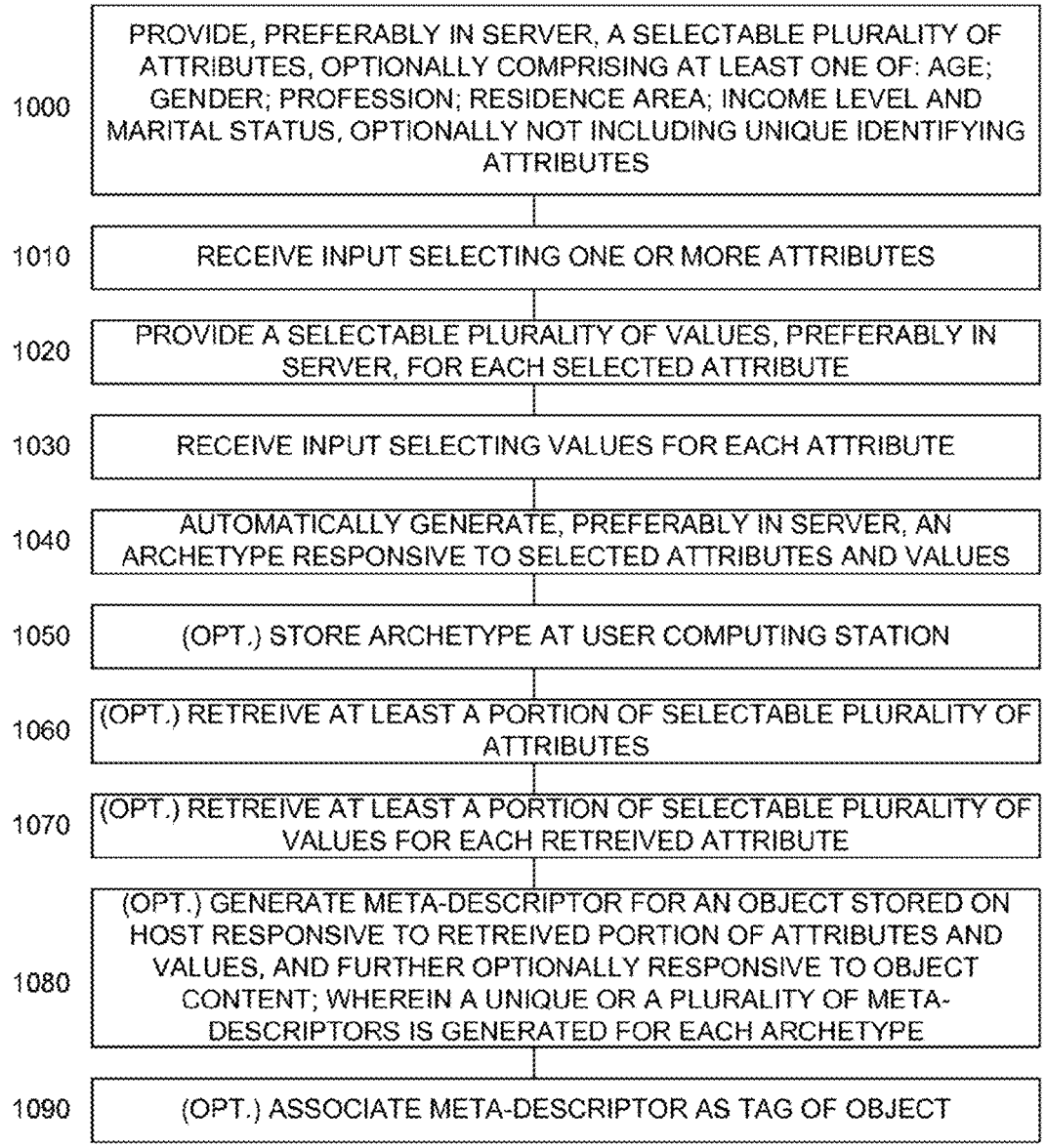
FIG. 5 illustrates a high level flow chart of a method of targeted searching or browsing according to an exemplary embodiment.

FIG. 5 illustrates a high level flow chart of a method of providing targeted searching or browsing, according to an exemplary embodiment. In stage 1000 a selectable plurality of attributes are provided, preferably in a network accessible server, such as server 20 of the previous figures. The selectable plurality of attributes optionally comprises at least one of: age, gender, profession, residence area, income level and marital status. In one embodiment the attributes do not represent any personal information, such as: name, telephone number, or address. In one embodiment the selectable plurality of attributes are presented to a user at a user computing station, such as user computing station 40 of FIGS. 1 and 4.

In stage 1010 an input is received at the network accessible server representing a selection of one or more attributes. In one embodiment the input is responsive to a user input provided via user input device 100. In stage 1020, for each selected one of the selectable plurality of attributes of stage 1000, a selectable plurality of values are provided in the network accessible server. In one embodiment the selectable plurality of values are shown to a user at the user computing station. As described above, the term values used herein includes any word, or words, defining the different options that exist for each attribute. It is to be understood, that in the event that specific digits are allowed, each potential value, which may be entered by the user, is considered to be one of the selectable values.

In stage 1030 an input is received at the network accessible server representing a selection of a value for each selected attribute. In one embodiment the input is a user input provided via user input device 100. In one embodiment the selected values provide at least a partial description of the user. In stage 1040 an archetype is automatically generated, preferably in the server, responsive to the selected attributes and values of stages 1010 and 1030. In one embodiment the generated archetype is encoded with a pre-determined coding. In optional stage 1050 the generated archetype is then stored on the user computing station. In one embodiment the generated archetype is further stored on the network accessible server.

In optional stage 1060 at least a portion of the selectable plurality of attributes of stage 1000 is retrieved, preferably by network accessible host 30 of system 10 as described above in relation to FIGS. 1 and 3. In another embodiment the retrieving is done by the server 20. In optional stage 1070 at least a portion of the selectable plurality of values of stage 1020 is retrieved for each retrieved attribute of stage 1060, preferably by network accessible host 30 of system 10 as described above in relation to FIGS. 1 and 3. In another embodiment the retrieving is done by the server 20.

In optional stage 1080 a meta-descriptor is generated responsive to the retrieved attributes and values. In one embodiment the meta-descriptor is generated for an object stored on the network accessible host. In one embodiment the meta-descriptor is generated by the network accessible host, and in another embodiment the meta-descriptor is generated by the server. In one embodiment a unique meta-descriptor is generated for each generated archetype of stage 1040. In another embodiment a plurality of meta-descriptors are generated, each generated meta-descriptor corresponding to at least a portion of a generated archetype of stage 1040. In one embodiment each generated meta-descriptor is encoded with a pre-determined code, in one embodiment the pre-determined code being the same as the pre-determined code of stage 1040. In one embodiment the meta-descriptor is further generated responsive to the content of the respective object, wherein the generated meta-descriptor comprises attributes and values representing the targeted population of the object. In one embodiment a meta-descriptor is retrieved from the server, such as server 20 accessible via network 50, for an object stored on network accessible host 30.

In optional stage 1090 the generated meta-descriptor is associated as a tag of the object. In one embodiment the meta-descriptor is attached to an existing meta-data tag of the object.

In another embodiment, the user can choose between one or more archetypes. He can change archetypes at any time. In this manner, the user can initially browse the network (e.g., Internet, World Wide Web or "Web") using one set of traits, and then another set. In a further extension of this embodiment, the user can use an anonymizer server to maintain his privacy. In this case, the server obfuscates the IP address of the user's computer. The user can now browse the network anonymously without any back-link to him.

In some aspects, we now teach to expand the server functionality by enabling the user to register himself as one or more archetypes. This can be done as options presented on the user device screen, during or after the login to the anonymizer server. The user can choose an archetype or create a new one. After choosing or creating an archetype the user can at any time edit the chosen trait or traits of the archetype. If the chosen trait has additional values which can be changed, the user can change such values. For example, the user can, after login, choose a new archetype and choose age=40, profession=engineer. Alternatively the user can chose sex female, age=55, likes=sushi. The anonymizer server has associated with the archetype a long term memory such as hard disk or solid state disk or other method of maintaining electronic information. The memory is used to record the user's browsing history and to maintain cookies and other web related information.

In an embodiment, this information is kept at the anonymizer server or at another memory location but distinct and apart from the user computer and no user information is contained in the archetype or browsing record data. In this manner the user can browse the network (e.g., surf the Web) using an archetype, enjoying the customization of the web and all such information associated with a given archetype, but without any means of identifying said archetype with the user.

In another embodiment, the archetype information is accessible to enable physical objects such as a car, a house, or physical locations such as a shop, train station to adapt their characteristics based on user selectable attributes. The access can be through a mechanism for identification of the user. Identification mechanisms can include near field communication (NFC) Blue tooth, or other wireless techniques. Alternatively the identification mechanism can be a visual identification of the user, or an identification of features on the mobile device screen. Once the user is identified, the archetype information can be provided by the mobile device or if the physical device is connected to the network the device can access the information from the server like the web site described earlier. The archetype information can include physical attributes such as height, age, or other elements, which can be used to tune the physical device to the user.

Figure 6:
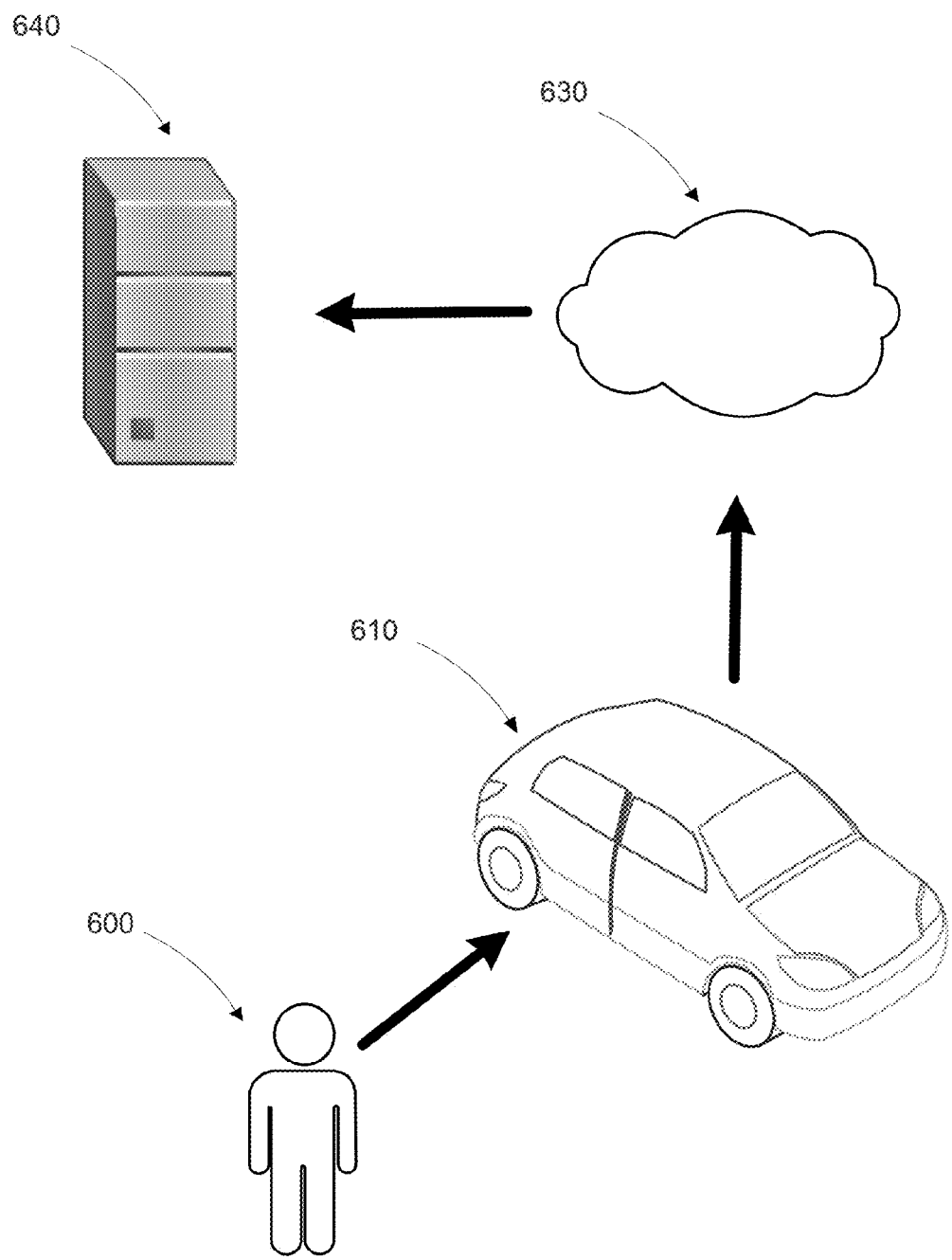
FIG. 6 illustrates a conceptual representation of the present method among communicating entities.

FIG. 6 illustrates conceptually the interactions and elements of an exemplary system and method according to the present disclosure. In an aspect, the physical device can get and add information regarding the user. For example if a person 600 enters the car 610 for the first time, he adjusts the seat and mirrors. The adjustment setting is added to the archetype information and can now be used the next time he enters the car. This information can also be used for other physical or virtual devices, web sites, etc. The information is delivered through a network, e.g., a cloud type information system 630 to a storage medium or a server 640 as appropriate. Thus, for example from seat adjustment, the user can now use his size and dimension information in other sites like clothing. Of course, these examples can be extended to myriad others, and are only provided here for the sake of illustration and explanation of the overall idea.

Furthermore, the system can detect inconsistencies such as a user entering the car and yet his height is not the recorded height, indicating an attempt to steal the car. User privacy can be maintained in a similar manner previously. All user information is associated with an archetype and not directly with the user. In this manner, the user can log in to an anonymizer site through his mobile device. After logging into the service, he chooses an archetype. The phone now uses the archetype to identify him to physical object. The information may not be kept on the phone. The user information is normally kept at the anonymizer server. In this manner, the phone can now provide identification information without maintaining a record of such information, thereby maintaining user privacy.

A server may be either a stand-alone server or as one or more instances of computer servers in a cloud network. The division of work, and activity of said servers dictated by the control elements of the web services or other remote services. Similarly any reference to a computer can be expanded to any Internet access device or to any device with a remote network connection. Such device can include but not limited to a cell phone, tablet computing device, car computer, or other such mobile or static device.

Thus certain elements of the present embodiments enable a method and system for generating archetypes for users and meta-descriptors for network hosted objects, such as web sites. In one embodiment a user selects at least one attribute from a selectable plurality of attributes. The user further selects a value, from a selectable plurality of values, for each selected attribute. An archetype is then generated responsive to the selected attributes and values, and the archetype is thus representative of the user, without revealing personal identifying information. A meta-descriptor is generated responsive to the selectable plurality of attributes and associated valued and attached to a network-hosted object. In one embodiment, when the user performs a search, using a search tool, only objects with a meta-descriptor corresponding to the archetype of the user are displayed to the user.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patent, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

What is claimed is:

1. A system comprising a server and a network accessible host, said server comprising a processor and a server memory, said network accessible host in communication with said server, said processor arranged to:
   provide one or more user-selectable attributes of a user, said user-selectable attributes being stored in the server memory;
   retrieve from a sensor one or more measured user physical attributes corresponding to a user, said one or more measured user physical attributes measured by an interaction of said user with said sensor;
   generate an archetype corresponding to the user using one or more selected user attributes and said one or more measured user physical attributes, said selected user attributes comprising said user-selectable attributes of said user that have been selected by said user; and
   retrieve from said server one or more of said selected user attributes, wherein said network accessible host is arranged to:
      generate a meta-descriptor for an object stored on said network accessible host, said meta-descriptor generated responsive to one or more of said retrieved selected user attributes and said one or more measured user physical attributes; and
      associate said generated meta-descriptor as a tag of said object.

2. The system according to claim 1, further comprising a user computing station in communication with said server, said user computing station comprising a user input device, wherein each of said selected user attributes is selected responsive to said user input device, and wherein each of said selected user attributes includes a plurality of selected user values responsive to said user input device.

3. The system according to claim 2, wherein said user computing station further comprises a user computing station memory, and wherein said generated archetype is stored on said user computing station memory.

4. The system according to claim 3, further comprising a search engine stored on said user computing station memory, said search engine configured to filter a user search using said archetype.

5. The system according to claim 2, said network accessible host in communication with said server and arranged to:
   retrieve from said server at least a portion of said selected user attributes and at least a portion of said measured user physical attributes;
   retrieve, for each of said at least a portion of said selected user attributes, at least a portion of said selected user values; and
   retrieve, for each of said at least a portion of said measured user physical attributes, a measured user physical value.

6. The system according to claim 5, wherein said meta-descriptor is generated responsive to one or more of said retrieved selected user attributes, said selected user values, said one or more measured user physical attributes, said measured user physical values, and an attribute and a value of a target population of said object.

7. The system according to claim 1, wherein said generating of said meta-descriptor is further responsive to the content of said object.

8. The system according to claim 1, wherein for each generated archetype at least one unique matching meta-descriptor is generated.

9. The system according to claim 1, wherein said user-selectable attributes comprise at least one of age; gender; profession; residence area; income level and marital status; and said measured user physical attributes comprise at least one of height; temperature; weight; and facial features.

10. The system according to claim 1, wherein said archetype does not support unique identifying information.

11. A method for providing targeted searching, advertisement or browsing, the method comprising:
    in a network accessible server, retrieving from a sensor a plurality of user physical attributes corresponding to a user, said plurality of user physical attributes measured by an interaction of said user with said sensor;
    generating in the network accessible server an archetype corresponding to the user and responsive to one or more selected user values of selected user attributes of said user and one or more measured sensor values of said user physical attributes, said selected user attributes selected by said user;
    in a network accessible host in communication with said network accessible server:
       retrieving from said network accessible server one or more of the plurality of said selected user attributes and one or more of the plurality of said measured user physical attributes;
       generating a meta-descriptor for an object stored on said network accessible host, said meta-descriptor generated responsive to said retrieved selected user attributes, said retrieved measured user physical attributes, said one or more selected user values, and said one or more measured sensor values; and
       associating said generated meta-descriptor as a tag of the object.

12. The method according to claim 11, further comprising receiving a user input, wherein each of said selected user attributes is selected responsive to said received user input, and wherein each of said selected user values for each of said selected user attributes is selected responsive to said received user input.

13. The method of claim 11, further comprising storing said generated archetype at a user computing station.

14. The method according to claim 13, wherein said user computing station filters a user search using said archetype.

15. The method of claim 11, further comprising, in said network accessible host:
  retrieving at least a portion of said selected user attributes and at least a portion of said measured user physical attributes;
  retrieving, for each of said retrieved selected user attributes, at least a portion of said selected user values; and
  retrieving, for each of said measured user physical attributes, at least a portion of said measured sensor values.

16. The method according to claim 15, wherein said meta-descriptor is generated responsive to said retrieved selected user attributes, said retrieved measured user physical attributes, said one or more selected user values, and said one or more measured sensor values, and an attribute and a value of a target population of said object.

17. The method of claim 11, wherein said generating of said meta-descriptor is further responsive to the content of the object.

18. The method of claim 11, wherein for each generated archetype at least one unique matching meta-descriptor is generated.

19. The method according to claim 11, wherein said selected user attributes comprise at least one of age; gender; profession; residence area; income level and marital status; and said measured user physical attributes comprise at least one of height; temperature; weight; and facial features.

20. The method according to claim 11, wherein said archetype does not support unique identifying information.

21. The method of claim 11, wherein said plurality of user physical attributes is measured by an interaction of said user with a physical object, said sensor disposed on or in said physical object, wherein said physical object is not a user computer or a user mobile communication device.

22. The method of claim 21, further comprising:
  comparing said at least one measured user physical attribute with a prestored user physical attribute associated with said archetype; and
  providing an indication of an authorized use or possession of said physical object if said at least one measured user physical attribute is different than said prestored user physical attribute.

* * * * *